United States Patent
Buttet

(10) Patent No.: US 11,370,713 B2
(45) Date of Patent: Jun. 28, 2022

(54) MANUFACTURING METHOD FOR CERAMIC COMPOSITE MATERIAL

(71) Applicant: HUBLOT SA, GENÈVE, Geneva (CH)

(72) Inventor: Mathias Buttet, Monnaz (CH)

(73) Assignee: HUBLOT SA, GENEVE, Geneva (CH)

( * ) Notice: Subject to any disclaimer, the term of this patent is extended or adjusted under 35 U.S.C. 154(b) by 995 days.

(21) Appl. No.: 15/543,512

(22) PCT Filed: Jan. 15, 2016

(86) PCT No.: PCT/EP2016/050842
§ 371 (c)(1),
(2) Date: Jul. 13, 2017

(87) PCT Pub. No.: WO2016/113422
PCT Pub. Date: Jul. 21, 2016

(65) Prior Publication Data
US 2018/0327318 A1      Nov. 15, 2018

(30) Foreign Application Priority Data
Jan. 15, 2015   (EP) .................................... 15151334

(51) Int. Cl.
*C04B 35/48*     (2006.01)
*C09K 11/77*     (2006.01)
(Continued)

(52) U.S. Cl.
CPC ............ *C04B 35/48* (2013.01); *C04B 35/443* (2013.01); *C04B 35/645* (2013.01);
(Continued)

(58) Field of Classification Search
CPC .......... C09K 11/7706; C09K 11/77062; C09K 11/77064; C09K 11/77066;
(Continued)

(56) References Cited

U.S. PATENT DOCUMENTS

| 2,544,236 | A | 3/1951 | Reimert et al. |
| 3,294,699 | A | 12/1966 | Horst |

(Continued)

FOREIGN PATENT DOCUMENTS

| JP | H04124062 A | 4/1992 |
| JP | H07500366 A | 1/1995 |

(Continued)

OTHER PUBLICATIONS

Artemyeva. Luminescence of photoactivated pristine and Cr-doped MgAl2O4 spinel. Chemical Physics Letters 626 (2015) 6-10 (Year: 2015).*

(Continued)

*Primary Examiner* — Matthew E. Hoban
(74) *Attorney, Agent, or Firm* — von Briesen & Roper, s.c.

(57) ABSTRACT

Method for manufacturing a composite material combining a metal oxide or metalloid based matrix suited for allowing light to pass, and a mineral pigment dispersed in the matrix, the method comprising a step of mixing the mineral pigment in powder form with the matrix in powder form, and a step of sintering of the mixture under sufficient pressure such that the densification temperature of the matrix under said pressure is below the breakdown temperature of the mineral pigment, where the sintering temperature is greater than or equal to the densification temperature of the matrix and below the breakdown temperature of the mineral pigment.

11 Claims, 2 Drawing Sheets

(51) Int. Cl.
  *C09C 1/40* (2006.01)
  *C09C 3/06* (2006.01)
  *C09C 1/36* (2006.01)
  *C04B 35/443* (2006.01)
  *C04B 35/645* (2006.01)
  *C09C 1/00* (2006.01)
  *C09K 11/02* (2006.01)

(52) U.S. Cl.
  CPC .......... *C09C 1/0009* (2013.01); *C09C 1/3661* (2013.01); *C09C 1/40* (2013.01); *C09C 1/405* (2013.01); *C09C 1/407* (2013.01); *C09C 3/063* (2013.01); *C09K 11/025* (2013.01); *C01P 2004/61* (2013.01); *C01P 2004/62* (2013.01); *C01P 2004/84* (2013.01); *C01P 2006/60* (2013.01); *C04B 2235/3222* (2013.01); *C04B 2235/3232* (2013.01); *C04B 2235/3246* (2013.01); *C04B 2235/3472* (2013.01); *C04B 2235/5436* (2013.01); *C04B 2235/5445* (2013.01); *C04B 2235/656* (2013.01); *C04B 2235/763* (2013.01); *C04B 2235/9661* (2013.01)

(58) Field of Classification Search
  CPC ........ C09K 11/77067; C09K 11/77068; C09K 11/025; C04B 35/48; C04B 35/443; C04B 35/645
  See application file for complete search history.

(56) References Cited

U.S. PATENT DOCUMENTS

| | | | |
|---|---|---|---|
| 3,711,308 A * | 1/1973 | Brand | A61Q 1/02 106/417 |
| 4,086,100 A | 4/1978 | Esselborn et al. | |
| 4,344,987 A | 8/1982 | Ostertag et al. | |
| 5,522,923 A | 6/1996 | Kimura et al. | |
| 5,607,621 A | 3/1997 | Ishihara et al. | |
| 5,846,911 A | 12/1998 | Freyhardt et al. | |
| 6,051,045 A | 4/2000 | Narula | |
| 7,526,928 B1 | 5/2009 | Kearnes | |
| 2008/0026207 A1 * | 1/2008 | Fink-Petri | C09C 1/66 428/328 |
| 2014/0124702 A1 * | 5/2014 | Berner | C04B 35/4885 252/301.4 F |
| 2014/0349009 A1 | 11/2014 | Kitamura et al. | |
| 2015/0307405 A1 * | 10/2015 | Huguet | C04B 35/64 368/280 |

FOREIGN PATENT DOCUMENTS

| | | |
|---|---|---|
| JP | 2002326862 A | 11/2002 |
| JP | 2011207745 A | 10/2011 |
| JP | 2011213522 A | 10/2011 |
| JP | 2014095077 A | 5/2014 |
| WO | WO 02/083814 A1 | 10/2002 |
| WO | WO 2908/090909 A1 | 7/2008 |

OTHER PUBLICATIONS

Li. High-pressure sintered yttria stabilized zirconia ceramics. Ceramics International 35 (2009) 453-456 (Year: 2009).*
Chinese Office Action for Application No. 201680007516.6; dated Jun. 21, 2019.
International Search Report related to Application No. PCT/EP2016/050842 dated Apr. 7, 2016.
Llusar M et al: "Colour analysis of some cobalt-based blue pigments", Journal of the European Ceramic Society, Elsevier Science Publishers, Barking, Essex, GB, vol. 21, No. 8, Aug. 1, 2001 (Aug. 1, 2001), pp. 1121-1130, XP027368820, ISSN: 0955-2219 [extrait le Aug. 1, 2001] alinéa [experimental] tableau 1 figure scheme 1.
Quenard O et al: "Synthesis, microstructure and oxidation of Co—MgA1204 and Ni—MgA1204 nanocomposite powders", Nanostructured Materials, Elsevier, New York, NY, US, vol. 7, No. 5, Jan. 1, 1996 (Jan. 1, 1996), pp. 497-507, XP004008189, ISSN: 0965-9773, DOI: 10.1016/0965-9773(96)00026-8 pp. 497-499 figure 6.
Saberi A et al: "A novel approach to synthesis of nanosize MgA1204 spinel powder through sol-gel citrate technique and subsequent heat treatment", Ceramics International, Elsevier, Amsterdam, NL, vol. 35, No. 3, Apr. 1, 2009 (Apr. 1, 2009), pp. 933-937, XP025915278, ISSN: 0272-8842, D0I:10.1016/J.CERAMINT. Mar. 11, 2008 [extrait le Jul. 2, 2008] col. 2, ligne 66-col. 8 tableau 1 exemples 1-11.

* cited by examiner

MANUFACTURING METHOD FOR CERAMIC COMPOSITE MATERIAL

CROSS-REFERENCE TO RELATED APPLICATION

This Application is a 35 USC § 371 US National Stage filing of International Application No. PCT/EP2016/050842 filed on Jan. 15, 2016, and claims priority under the Paris Convention to European Patent Application No. 15151334.8 filed on Jan. 15, 2015.

FIELD OF THE DISCLOSURE

The present invention relates to composite materials comprising ceramics, in particular metal oxide or metalloid based, manufacturing methods therefore and uses thereof.

BACKGROUND OF THE DISCLOSURE

Industrially manufactured colored ceramics are in general aluminum oxides (alumina) or zirconium oxides filled and mixed with a pigment. A pigment is a coloring substance insoluble in the medium that it colors. In particular, pigments are used to color a material in bulk.

In some cases, oxides can also be colored directly by the creation of defects, such as heteroatoms, in the crystalline structure.

The manufacturing of colored ceramic components is well-managed for some colors such as black, white, blue and green, but not for all colors.

For example, despite all the effort applied, it has still never been possible to produce a bright red color ceramic. There are only shades of red/orange or red/brown ceramics.

In fact, the manufacturing method for colored ceramics consists of mixing powdered ceramic with the mineral pigment and then injecting all of it in a mold to get what is called a "green body" bound by a polymer. This green body is next unbound, for example by heating to 600° C., since the polymer binding then sublimates. The green body is finally sintered at a temperature close to the melting point of the ceramic, thus causing densification thereof and resulting in a solid piece.

The rate of pigment used varies according to the desired color but in general several percent by volume, typically of order 3 to 5%, are sufficient for coloring the ceramic. In fact, during the sintering phase, the pigment is in general going to diffuse into the ceramic which is white and which in that way is going to take on the color of the pigment.

However, when the pigment does not diffuse into the ceramic—the ceramic appears white—which reduces the power of the added pigment. The resulting colors are in general pale and lacking in aesthetic interest.

In particular there is no red color pigment which can maintain its color after the sintering step. The resulting colors draw instead on orange, bordeaux or even brown.

The present invention has in particular the goal of proposing a new composite material with which to significantly enlarge the range of possible colors in colored ceramic manufacturing.

The purpose of the present invention is also to propose a new composite material comprising a luminescent pigment.

SUMMARY OF THE DISCLOSURE

For this purpose, the invention relates to a method for manufacturing a composite material combining:

a metal oxide or metalloid based matrix, where said matrix is suited for allowing light to pass (after sintering) and has densification temperatures which depend on the pressure to which said matrix is subject;

a mineral pigment dispersed in the matrix, having a certain breakdown temperature beyond which said mineral pigment is broken down;

where the densification temperatures of the matrix are greater than the breakdown temperature of the mineral pigment in at least one pressure range below 80 MPa, in particular at atmospheric pressure;

the method comprising the following steps:

a) mixing the mineral pigment in powder form with the matrix in powder form; and b) sintering of said mixture of powders at some sintering temperature and under a pressure greater than or equal to 80 MPa sufficient in order that the densification temperature of the matrix under said pressure is below the breakdown temperature of the mineral pigment, where the sintering temperature is greater than or equal to the densification temperature of the matrix and below the breakdown temperature of the mineral pigment.

The invention also relates to a method for manufacturing a composite material combining:

a metal oxide or metalloid based matrix, where said matrix is suited for allowing light to pass (after sintering) and has densification temperatures which depend on the pressure to which said matrix is subject;

a mineral pigment dispersed in the matrix, having a certain breakdown temperature beyond which said mineral pigment is broken down;

where the densification temperatures of the matrix are greater than the breakdown temperature of the mineral pigment in at least one pressure range below 100 MPa, in particular at atmospheric pressure;

the method comprising the following steps:

a) mixing the mineral pigment in powder form with the matrix in powder form; and b) sintering of said mixture of powders at some sintering temperature and under a pressure greater than or equal to 100 MPa sufficient in order that the densification temperature of the matrix under said pressure is below the breakdown temperature of the mineral pigment, where the sintering temperature is greater than or equal to the densification temperature of the matrix and below the breakdown temperature of the mineral pigment.

Because of these arrangements, it is possible to obtain ceramic composite materials with a very large color palette, in particular including bright red color ceramics. In fact, since the matrix is suited for allowing light to pass, meaning that it is transparent or translucent, it serves to allow the color of the pigment to diffuse to the outside of the material even if the pigment particle is located deep inside the matrix. This has the effect of increasing the pigmentation surface of the material and therefore increasing the vividness of the color thereof.

In preferred embodiments of the method according to the invention, use can also advantageously be made of one and/or the other of the following dispositions:

The mineral pigment has an average diameter included between 0.2 µm and 10 µm;

The densification temperature of the matrix under said pressure applied during sintering is below 1300° C.;

The sintering temperature (temperature applied during sintering) is below 1300° C., even below or equal to 1200° C.;

The mineral pigment represents a fraction by volume of said composite material included between 2% and 50%;

The mineral pigment is based on cobalt aluminate $CoAl_2O_4$;

The mineral pigment is in discrete particle form, each comprising a core and a colored coating surrounding the core;

The colored coating is an oxide comprising iron, chrome, aluminum, titanium, silicon, zinc, nickel, cobalt, cadmium, copper, vanadium, bismuth and/or manganese;

The core of the mineral pigment is suited for allowing light to pass;

The core of the mineral pigment is fabricated from a material chosen among mica, alumina, zirconium and titanium dioxide;

The formula of the colored coating is $KAl_2(AlSi_3O_{10})(OH)_2$;

The ceramic matrix is based on magnesium aluminate spinel $MgAl_2O_4$;

The ceramic matrix is based on zirconium stabilized with yttrium;

The pressure applied during sintering is at least equal to 200 MPa;

The color of the mineral pigment (and in particular the aforementioned colored coating) is bright red;

The mineral pigment is luminescent;

The mineral pigment comprises rare earth aluminates and/or rare earth silicates;

The mineral pigment is based on strontium aluminate doped with europium;

The pressure applied during sintering is at least equal to 600 MPa.

The object of the invention is also a composite material combining:

A mineral pigment; and

A metal oxide or metalloid based matrix, where said matrix is suited for allowing light to pass and has a densification temperature under pressure that is below a breakdown temperature of the mineral pigment.

In various embodiments of the composite material according to the invention, use can further be made advantageously of one and/or the other of the following dispositions:

The mineral pigment represents a fraction by volume of said composite material included between 2% and 50%;

The mineral pigment is based on cobalt aluminate $CoAl_2O_4$;

The mineral pigment may be in discrete particle form, each comprising a core and a colored coating surrounding the core;

The colored coating is an oxide comprising iron, chrome, aluminum, titanium, silicon, zinc, nickel, cobalt, cadmium, copper, vanadium, bismuth and/or manganese;

The core of the mineral pigment is suited for allowing light to pass;

The core of the mineral pigment is fabricated from a material chosen among mica, alumina, zirconium and titanium dioxide;

The mineral pigment is luminescent;

The mineral pigment comprises rare earth aluminates and/or rare earth silicates;

The mineral pigment is based on strontium aluminate doped with europium;

The mineral pigment has an average diameter included between 0.2 µm and 10 µm;

The densification temperature of the matrix under pressure is below 1300° C.;

The matrix is a ceramic, in the sense that it is made up of metal oxides;

The matrix is based on magnesium aluminate spinel $MgAl_2O_4$.

Finally, a further purpose of the invention is a use of a composite material resulting from the aforementioned method in watch or jewelry making.

BRIEF DESCRIPTION OF THE DRAWINGS

The invention will be better understood upon reading the following description of several embodiments thereof, given solely as examples without limitation and in reference to the attached drawings, in which.

DETAILED DESCRIPTION OF THE DISCLOSURE

Figure 1:
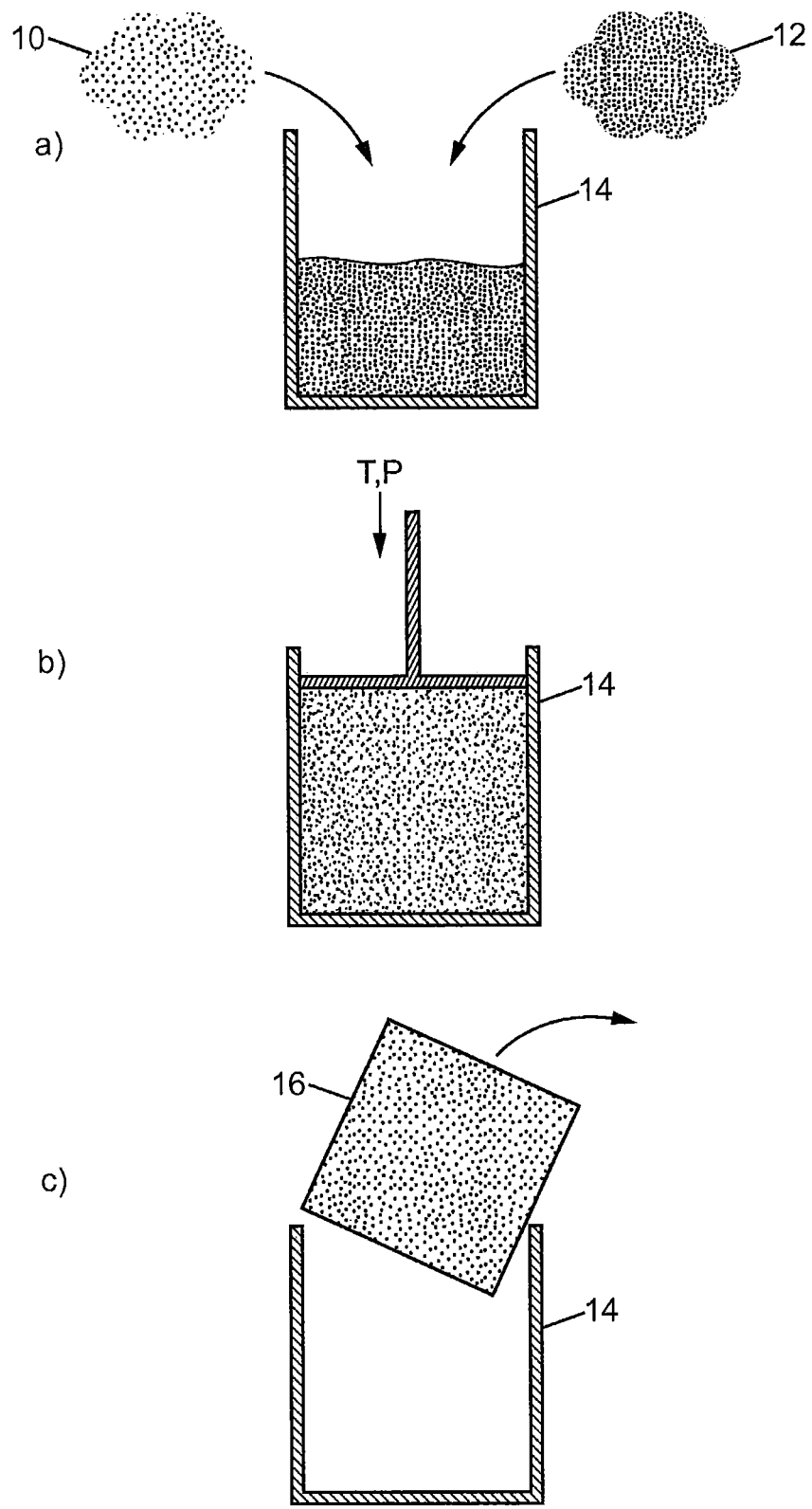
FIG. 1 is a schematic illustration of a sample manufacturing method of a composite material according to an embodiment of the invention.

As explained above, the invention relates to a composite material intended to be used in particular in watcher jewelry making, said material combining:

A mineral pigment; and

A metal oxide or metalloid based matrix, where the matrix is suited for allowing light to pass and has a densification temperature under a suitable pressure that is below a breakdown temperature of the mineral pigment.

The mineral pigment can represent a fraction by volume included between 2% and 50% of the composite material.

The mineral pigment is chosen based on the desired color of the composite material.

For blue and green, a mineral pigment based on aluminum and cobalt is chosen, in particular cobalt aluminate $CoAl_2O_4$ with spinel crystalline structure. In this case, the material is colored in the bulk. The blue or green color of the pigment and the vividness of the color of the pigment depend on the oxidation level thereof.

Aside from cobalt aluminate, it is also possible to use compounds having the following chemical formulas; the blue or green color and also the vividness of the color again depend on the oxidation level:

$(Co,Zn)Al_2O_4$;

$(Zn,Co)(Cr,Al)_2O_4$;

$Co(Al,Cr)_2O_4$;

$CoAl_2O_4/Co_2SnO_4$.

Based on the desired color for the composite material, an element or combination of elements can be added for modifying the color of the compound. Chrome, lithium, magnesium, silicon, strontium, tin, titanium and zinc are in particular among these elements. There again, the blue or green color in the vividness of the color from the pigment depend on the oxidation level thereof.

For red and yellow, a mineral pigment in form of discrete particles each comprising a core and a colored coating surrounding the core are chosen instead. In fact, the vividness of these colors is too weak to color the material in the bulk.

Preferably, the core of the mineral pigment is suited for allowing light to pass, meaning that it is transparent or translucent.

Thus, if a particle is found on the surface of the composite material and it is polished, the color of the coating remains visible through the core.

For example, the core of the mineral pigment can be manufactured from a material chosen among:
- Mica, for example muscovite or biotite;
- Alumina, $Al_2O_3$;
- Zirconium oxide, $ZrO_2$;
- Titanium dioxide, $TiO_2$.

The colored coating can be an oxide comprising iron, chrome, aluminum, titanium, silicon, zinc, nickel, cobalt, cadmium, copper, vanadium, bismuth and/or manganese.

For example, it can in particular involve:
- $KAl_2(AlSi_3O_{10})(OH)_2$;
- $TiO_2$;
- $SiO_2$;
- $ZnO$.

Considering that the color and the vividness of the pigment depend on its oxidation level, it is possible to obtain all the colors with the above compounds.

The known colors are red, yellow, green, violet, black and blue. Thus, it is also possible to obtain a core/coating type mineral pigment for blue and green.

The thickness of the colored coating and also proportions of the various elements making up the mineral pigment participate in setting the color and vividness thereof.

The following documents give examples of red pigments with a titanium oxide and mica base: U.S. Pat. Nos. 4,344,987 A, 5,522,923 A and 4,086,100 A.

The mineral pigment can also be a luminescent source (phosphorescence and/or fluorescence) which comprises rare earth aluminates, for example strontium aluminate doped with europium. This is the case of the line of products known under the tradename Super-LumiNova® and which exist in various shades and colors. Rare-earth silicates or a mixture of rare-earth aluminates and silicates can also be luminescent sources.

There are also other products, such as "LumiBrite" developed by Seiko or less interesting sources like radio luminescent or auto luminescent sources which contain radioactive elements and whose use is strictly limited. Here we're talking about tritium, radium or promethium.

Some gases can also show a luminescent capacity, in these cases they are confined in glass capsules.

Some examples of luminescent pigments are given in the following documents: U.S. Pat. Nos. 3,294,699 A, 2,544,236 A, 5,607,621 A, WO 02/083814 A1 and U.S. Pat. No. 2,544,236 A.

It is also possible to use mineral pigments which have "interference" properties", meaning which show different color tones depending on the angle of observation under which they are seen.

For example, such interference properties can be obtained with the mineral pigment comprising a mica core, a composite oxide colored coating comprising titanium, iron and nickel surrounding the core and a layer of titanium dioxide surrounding the colored coating.

Other mineral pigments can further show, by the nature of their shape, other color effects, such as an pearly effect.

The mineral pigment can have an average diameter included between 0.2 µm and 10 µm.

Advantageously, the breakdown temperature of the mineral pigment is over 1300° C. This temperature corresponds to the decomposition temperature of the mineral pigment which leads to a color change therein or in other words to the temperature at which the color of the mineral pigment is altered.

The matrix is chosen such that the densification temperature thereof, under sufficient pressure, is below the breakdown temperature of the mineral pigment, therefore advantageously below 1300° C.

In general, luminescent pigments do not resist temperatures over 800° C. under an inert atmosphere. In this case, it will be necessary to increase the densification pressure of the matrix in order for it to be densified at 800° C. while also remaining transparent.

The matrix is suited for allowing light to pass, meaning that it is transparent or translucent. To do that, the matrix is for example prepared according to methods known for transparent ceramics. This adaptation resides in particular in the choice of the oxide and in the conditions for shaping, meaning the densification temperature and the pressure.

As previously seen, the matrix is metal oxide or metalloid oxide-based.

The metalloid concept refers to a chemical element which cannot be classified either in the metals or among the nonmetals, meaning whose physical and chemical properties are intermediate between those of the metal end of a nonmetal.

Metalloids are characterized by the following properties:
- their oxides are generally amphoteric (those of metals are somewhat basic and those of non-metals somewhat acidic);
- They behave like semiconductors (in particular boron, silicon and germanium).

The metalloids therefore form an oblique band in the periodic table between the metals and the non-metals:
- Boron $_5B$
- Silicon $_{14}Si$
- Germanium $_{32}Ge$
- Arsenic $_{33}As$
- Antimony $_{51}Sb$
- Tellurium $_{52}Te$
- Astatine $_{85}At$ In particular, the matrix can be a ceramic.

Among the ceramic matrices which can be used in connection with the present invention are magnesium aluminate spinel($MgAl_2O_4$), zirconium or pure alumina.

A composite material according to the invention can be manufactured in particular by the process shown in FIG. 1 and comprising the following steps:

a) mixture of mineral pigment 10 in powder form with the matrix 12 in powder form in a mold 14;

b) sintering of the mixture of powders under sufficient pressure such that the densification temperature of the matrix 12 under that pressure remains below the breakdown temperature of the mineral pigment 10, with the sintering takes place at a sintering temperature below the breakdown temperature of the mineral pigment 10 and at least equal to the densification temperature of the matrix;

c) withdrawal of the composite material 16 from the mold 14.

The pressure applied during sintering is generally greater than or equal to 80 MPa, even greater than or equal to 100 MPa and the invention is specifically suited to the case where the matrix has densification temperatures over the breakdown temperature of the mineral pigment in at least one pressure range below 80 MPa, or even below 100 MPa.

Thus, under pressure and heat, the mineral pigment is stable whereas the matrix coats all the mineral pigment particles.

In the case of luminescent pigments, where it is generally necessary to lower the densification temperature below the 800° C. limit, the pressure applied during sintering is generally over 600 MPa.

The light diffused at the surface of the composite material is sufficient to assure satisfactory color vividness.

The sintering can be done under uniaxial pressure using an SPS press ("Spark Plasma Sintering") in which the temperature can be increased in a few minutes.

It is also possible to end the sintering by sintering under isostatic pressure. In a first step it involves pressing the powder mixture to form pellets or to inject components by conventional injection technique for ceramics, and then performing a first sintering which will have the effect of closing the porosities without necessarily finishing the method. The sintering is then finalized in an oven which can be pressurized under gas up to 200 MPa in general.

Example 1

A magnesium aluminate spinel ($MgAl_2O_4$) powder is used that has a particle size of 0.2 μm with under 10 ppm Fe, Ca, and Na impurities and under 20 ppm Si impurities, for example the powder produced by Baikowski under product number S30 CR.

The dosage of mineral pigment can vary from 5% to 30% by volume.

The sintering of the spinel $MgAl_2O_4$ is generally done at a temperature over 1800° C. According to the invention, in order to preserve the mineral pigment and retain its vividness, the sintering is done at 1200° C., under very high, isostatic or uniaxial, pressure.

Densification of the spinel $MgAl_2O_4$ is possible in this temperature zone, on the condition that the pressure is over 80 MPa, or even over 100 MPa.

Additionally, a large range of pigments can be used in this temperature zone without them breaking down.

In this way a dense ceramic composite material results with a transparency which allows using the coloration from the mineral pigment over a depth of several tens of millimeters instead of having only the color effect from the surface pigment particles.

In particular, 32.76 g of $MgAl_2O_4$ spinel (S30 CR from Baikowski) is mixed with 4.6 g of red pigment ($TiO_2$ core with a coating of $KAl_2(AlSi_3O_{10})(OH)_2$) to obtain a mixture with 10% pigment by volume. A 30 mm diameter graphite mold is filled with 4 g of the mixture. The mixture is sintered under pressure for five minutes in an SPS press at 1200° C. with a 70 kN force corresponding to 100 MPa pressure. A bright red, dense ceramic disc results.

Figure 2:
FIG. 2 is a crystallographic section showing a composite material according to an embodiment of the invention.

The crystallographic section shown in FIG. 2 was made by scanning electron microscope (SEM), magnifying 1500 times, on a sample of a composite material manufactured according to the method from example 1 and polished with diamond particles up to 0.25 μm. The light zones correspond to pigment particles.

Example 2

Yttrium stabilized zirconium is used, which, after sintering at 1200° C. under a pressure over 200 MPa, isostatic or uniaxial, can lead to obtaining a transparent or translucent zirconium.

Thus, by mixing up to 30% by volume of red pigment with a yttrium stabilized zirconium (addition of yttrium of about 8%), an effect is obtained similar to that obtained with glass or $MgAl_2O_4$ spinel, meaning a transparent matrix with red pigments entrapped inside.

The invention therefore proposes new ceramic composite materials with a very large range of colors and also new composite materials comprising luminescent pigments.

In particular, colored ceramics with bright red color can be obtained with the invention, which was not previously possible.

In fact, while the majority of research done on the manufacturing of red ceramics has focused on obtaining a red pigment which can keep its color after the sintering step, as previously explained, in the present invention consideration was given in contrast to the matrix itself, specifically using a matrix where the sintering temperature remains below the temperature at which the color of the mineral pigment is altered.

The colored composite materials from the present invention will find applications in the manufacturing, for example, of components for dressing of watchmaking parts, such as bezels, middles, watchband buckles, etc. The advantage of these materials in this application is their resistance to wear and the assurance that the color of the components cannot be damaged by the constraints imposed on the watch worn on the wrist. Since the coloring is done at the core, even in an extreme case where the surface of the watch is scratched, the scratch in question will not have a different color than the surface, considering that it was not a coating but a bulk coloring.

One of the other applications considered is the manufacturing of dials by using the phosphorescent pigment for example. Dials manufactured with this material will have a hardness and a phosphorescent power much greater than a dial on which a phosphorescent paint had been applied. Since the matrix of the material is transparent, the illumination from pigments over 1 to 2 mm of depth is visible, in this way a significantly larger surface of pigment is visible, unlike a layer of paint which is only functional over a few microns.

This last application is particularly attractive in the field of sports watches for deep-sea diving.

The invention claimed is:

1. A method for manufacturing a product of watchmaking or jewelry making comprising a composite material, said composite material combining:
   a metal oxide or metalloid based matrix, where said matrix is suited for allowing light to pass after sintering and has densification temperatures which depend on the pressure to which said matrix is subject;
   a mineral pigment dispersed in the matrix, having a certain breakdown temperature beyond which said mineral pigment is broken down, wherein the mineral pigment is luminescent and comprises rare earth aluminates and/or rare earth silicates;
   where the densification temperatures of the matrix are greater than the breakdown temperature of the mineral pigment in at least one pressure range below 80 MPa;
   wherein manufacturing the composite material includes a sequence of transformation steps consisting:
   mixing the mineral pigment in powder form with the matrix in powder form; and
   sintering of said mixture of powders, in one single step, at a sintering temperature lower than 800° C. and under a pressure greater than or equal to 600 MPa sufficient in order that the densification temperature of the matrix under said pressure is below the breakdown temperature of the mineral pigment, where the sintering temperature is greater than or equal to the densification temperature of the matrix and below the breakdown temperature of the mineral pigment.

2. The method according to claim 1, wherein the mineral pigment has an average diameter included between 0.2 µm and 10 µm.

3. The method according to claim 1, wherein the densification temperature of the matrix under said pressure applied during sintering is below 1300° C.

4. The method according to claim 1, wherein the mineral pigment represents a fraction by volume of said composite material included between 2% and 50% of said composite material.

5. The method according to claim 1, wherein the ceramic matrix is based on magnesium aluminate spinel MgAl2O4.

6. The method according to claim 1, wherein the ceramic matrix is based on zirconium stabilized with yttrium.

7. The method according to claim 1, wherein the mineral pigment is based on strontium aluminate doped with europium.

8. The method according to claim 1, wherein said product is a watch dial.

9. A method for manufacturing a product of watch making or jewelry making comprising a composite material, said composite material combining:
- a metal oxide or metalloid based matrix, in which said matrix is suited for allowing light to pass after sintering and has densification temperatures which depend on the pressure to which said matrix is subject;
- a mineral pigment dispersed in the matrix having a certain breakdown temperature beyond which said mineral pigment is broken down, in which the mineral pigment is luminescent and comprises rare earth aluminates and/or rare earth silicates, and the densification temperatures of the matrix are greater than the breakdown temperature of the mineral pigment in at least one pressure range below 80 MPa;
- wherein manufacturing the composite material includes a sequence of transformation steps consisting in:
- mixing the mineral pigment in powder form with the matrix in powder form; and
- sintering of said mixture of powders, in one single step, under pressure greater than or equal to 80 MPa sufficient in order that the densification temperature of the matrix under said pressure is below the breakdown temperature of the mineral pigment, in which the sintering temperature is greater than or equal to the densification temperature of the matrix and below the breakdown temperature of the mineral pigment.

10. A method for manufacturing a composite material, the composite material combining:
- a metal oxide or metalloid based matrix, where said matrix is suited for allowing light to pass after sintering and has densification temperatures which depend on the pressure to which said matrix is subject;
- a mineral pigment dispersed in the matrix, having a certain breakdown temperature beyond which said mineral pigment is broken down, wherein the mineral pigment is luminescent and comprises rare earth aluminates and/or rare earth silicates;
- where the densification temperatures of the matrix are greater than the breakdown temperature of the mineral pigment in at least one pressure range below 80 MPa;
- wherein manufacturing the composite material includes a sequence of transformation steps consisting in:
- mixing the mineral pigment in powder form with the matrix in powder form; and
- sintering of said mixture of powders, in one single step, at a sintering temperature lower than 800° C. and under a pressure greater than or equal to 600 MPa sufficient in order that the densification temperature of the matrix under said pressure is below the breakdown temperature of the mineral pigment, where the sintering temperature is greater than or equal to the densification temperature of the matrix and below the breakdown temperature of the mineral pigment.

11. A method for manufacturing a composite material, the composite material combining:
- a metal oxide or metalloid based matrix, where said matrix is suited for allowing light to pass after sintering and has densification temperatures which depend on the pressure to which said matrix is subject;
- a mineral pigment dispersed in the matrix, having a certain breakdown temperature beyond which said mineral pigment is broken down, wherein the mineral pigment is luminescent and comprises rare earth aluminates and/or rare earth silicates;
- where the densification temperatures of the matrix are greater than the breakdown temperature of the mineral pigment in at least one pressure range below 80 MPa;
- wherein manufacturing the composite material includes a sequence of transformation steps consisting in:
- mixing the mineral pigment in powder form with the matrix in powder form; and
- sintering of said mixture of powders, in one single step, under pressure greater than or equal to 80 MPa sufficient in order that the densification temperature of the matrix under said pressure is below the breakdown temperature of the mineral pigment, where the sintering temperature is greater than or equal to the densification temperature of the matrix and below the breakdown temperature of the mineral pigment.

* * * * *